United States Patent

Cox et al.

[15] 3,693,435
[45] Sept. 26, 1972

[54] TIME AVERAGING METHOD AND APPARATUS FOR OBTAINING FLUID MEASUREMENTS

[72] Inventors: John B. Cox, 2608 Fannin St.; Jacque R. Stoltz, 3211 West Dengar, both of Midland, Tex. 79701

[22] Filed: Aug. 19, 1970

[21] Appl. No.: 65,037

Related U.S. Application Data

[62] Division of Ser. No. 693,867, Dec. 27, 1967, Pat. No. 3,580,072.

[52] U.S. Cl. ................................73/194 E, 73/61.1 R
[51] Int. Cl. ..................................................G01f 1/00
[58] Field of Search.............73/194 E, 194 R, 61.1 R, 73/231 M, 205 D

[56] References Cited

UNITED STATES PATENTS

| | | | |
|---|---|---|---|
| 2,623,389 | 12/1952 | Oosterom | 73/231 R |
| 3,066,529 | 12/1962 | Warren | 73/194 E |
| 3,176,514 | 4/1965 | Foster | 73/229 |

FOREIGN PATENTS OR APPLICATIONS

| | | | |
|---|---|---|---|
| 1,086,628 | 10/1967 | Great Britain | 73/231 M |

*Primary Examiner*—Charles A. Ruehl
*Attorney*—William J. Scherback, Frederick E. Dumoulin, William D. Jackson, Andrew L. Gaboriault and Sidney A. Johnson

[57] ABSTRACT

This specification discloses a method and apparatus for accumulating signals from a water-cut monitor and a flow meter in a form whereby the net oil and net water in an oil-water mixture may be determined. A flow meter signal in the form of constant-amplitude, frequency-variable d-c pulses is applied to a capacitor to charge the same. A signal from the water-cut monitor is modulated in proportion to the meter signal in order to produce a modulated signal of d-c pulses in which pulse amplitude is proportional to water content and pulse frequency is proportional to flow rate. This modulated signal is stored on another capacitor. Both capacitors are interrogated at periodic time intervals in order to obtain read-out signals representative of the charges thereon and the capacitors are discharged. Also disclosed is a system for obtaining gas flow information. In this system a pressure signal is modulated in proportion to a ΔP signal to produce a modulated signal of d-c pulses which is applied to a capacitor. The capacitor is interrogated as described above.

6 Claims, 3 Drawing Figures

PATENTED SEP 26 1972 3,693,435

JOHN B. COX
JACQUE R. STOLTZ
INVENTORS

ATTORNEY

TIME AVERAGING METHOD AND APPARATUS FOR OBTAINING FLUID MEASUREMENTS

This is a division of application Ser. No. 693,867 Dec. 27, 1967, now U.S. Pat. No. 3,580,072.

BACKGROUND OF THE INVENTION

FIELD OF THE INVENTION

This invention relates to fluid measurements and, more particularly, to methods and apparatus by which signals representative of the flow of a fluid through a distribution system and signals representative of a characteristic of such fluid may be averaged over time intervals and periodically interrogated to obtain read-outs representative of such time-averaged signals.

It is a conventional practice to measure the volume of fluid delivered through a fluid distribution system by means of a flow meter which provides an electrical output signal. Typically, the flow meter will include an impulse transmitter which produces a pulse for each unit volume, e.g., one-tenth of a barrel, which passes through the meter. The meter pulses may then be applied to a recorder such as an accumulating counter in order to indicate the total flow through the system during some time interval.

In addition to recording the volume of a fluid passing through a distribution system it is oftentimes desirable to monitor the fluid with respect to a characteristic thereof such as the concentration of a contaminate in the fluid. In the oil industry, for example, crude oil that is delivered through a distribution system to a pipeline or other terminal point normally is monitored with regard to its water content. This is accomplished by means of a device commonly termed a "BS&W" or "water-cut" monitor which measures the concentration of water in the crude oil and records these measurements and/or responds to a water concentration of some predetermined level to divert the oil to a treating system. The water-cut monitors in most common use are of the capacitance-probe type which detects the presence of water by means of a change in the dielectric constant of an oil stream flowing through a conduit. The BS&W monitor produces a read-out signal which is indicative of the percent water-cut, i.e., the concentration of water (and therefore of oil) in the crude oil stream passing through the probe. While this is of importance it also may be desirable to ascertain the absolute volumes of oil and water which pass through the system during a given period of time. For example, it often is necessary to determine the net oil and net water production of an oil lease at daily intervals or in terms of barrels of oil and barrels of water produced per day.

The net amounts of water and oil which pass through a distribution system may be determined through means of a water-oil volume meter. A typical water-oil volume meter comprises a capacitance-probe monitor which is coupled through suitable electronics to the output signal of a flow meter such as a conventional turbine meter. The capacitance-probe portion of the water-oil volume meter functions to determine the percent water-cut at short time intervals, e.g., on the order of one or two seconds, and electronically divides the total volume of fluid measured by the turbine meter during this time interval into barrels of water and barrels of oil. The net water and net oil outputs normally take the form of digital pulses which may be fed to local accumulating counters for visual display and/or to remote electronic recording systems. While available water-oil volume meters normally provide for measurements within acceptable ranges of reliability they are relatively expensive because of the sophisticated electronics involved and require a high caliber of preventive maintenance which oftentimes is not readily available.

SUMMARY OF THE INVENTION

In accordance with the present invention there is provided a method and apparatus for use in monitoring the flow of fluid through a distribution system. In carrying out the invention, a d-c (direct current) signal of constant amplitude time-spaced pulses representative of the flow rate through the conduit is generated. This signal is applied to a capacitor in order to charge the capacitor over a time interval in proportion to the cumulative amount of signal applied thereto. A read-out signal representative of the charge on the capacitor is produced and the capacitor is discharged. Thereafter the capacitor is again charged and the above steps repeated.

In accordance with another aspect of the invention, there is provided a new and relatively inexpensive technique for time-averaging fluid flow and fluid characteristic signals and producing read-outs of such averaged signals from which the characteristic monitored for can be ascertained quantitatively, even though the fluid flow rate may vary widely during the averaging intervals. In carrying out this embodiment of the invention a d-c signal representative of fluid flow through a distribution system is applied to a capacitor as described above. In addition, a d-c signal representative of a monitored characteristic of the fluid is generated and modulated in proportion to the fluid-flow signal. The modulated characteristic signal, which is in the form of time-spaced d-c pulses, is fed to another capacitor which charges in proportion to the cumulative amount of signal applied thereto. Thereafter, a read-out representative of the charge on each of the capacitors is obtained and the capacitors are discharged.

In another embodiment of the invention, there is provided a time-averaging system which produces read-outs whereby there may be determined the cumulative oil and water in an oil-water mixture passing through a fluid distribution system. This embodiment of the invention comprises a water-cut monitor and a liquid flow meter located in the distribution system. First and second signal means are associated with the monitor and meter, respectively, for producing an analog d-c signal representative of the water content of the oil-water mixture and a d-c signal of constant-amplitude time-spaced pulses representative of the liquid flow through the meter. The first signal means is connected to a first capacitor by way of a circuit including a modulator which functions to modulate the water content signal in proportion to the liquid-flow signal. The modulated water content signal stored on the first capacitor is a d-c pulse signal in which the pulse amplitude is proportional to water content and the pulse frequency proportional to flow rate. A second circuit interconnects the second signal means and a second capacitor for passing the liquid-flow signal to the second capacitor. The system further comprises means for producing a read-out signal representative of the charge on each of the first and second capacitors and means for discharging these capacitors.

In a further aspect of the invention there is provided a new and improved technique whereby read-out signals from a plurality of measuring stations may be applied to a central station. The central station is adapted to carry out recording and/or computation functions with regard to the measured data, thus eliminating the need for expensive local electronics at each measuring station. In this aspect of the invention, fluid-flow signals, or fluid-flow and modulated characteristic signals, are stored on capacitors at the measuring stations. Read-out signals representative of the charges on the capacitors then are transmitted to the central station at suitable time intervals.

DESCRIPTION OF SPECIFIC EMBODIMENTS

Figure 1:
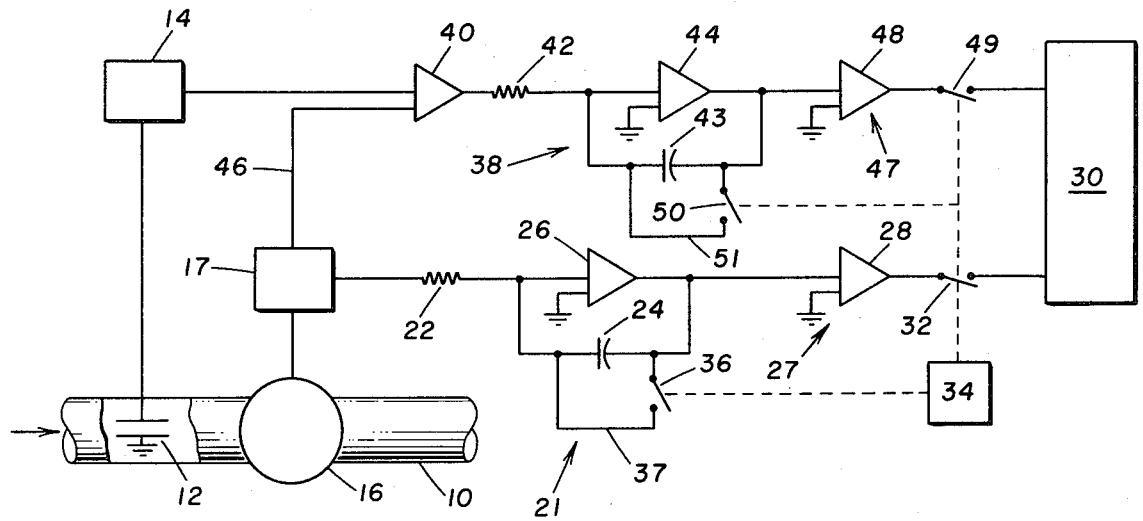
FIG. 1 is a schematic illustration showing one form of the invention as applied in obtaining oil and water volume measurements.
Figure 1:
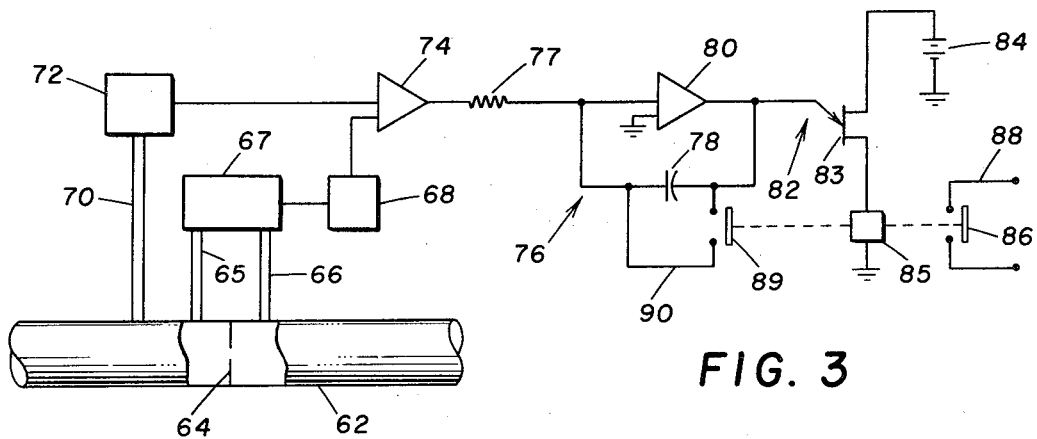

In FIG. 1 there is shown a preferred form of the invention which embodies a system for accumulating output signals from a water-cut monitor and a liquid-flow meter in a form whereby total volume, net oil, and net water may be determined. In the system shown in FIG. 1 a water-cut signal and a meter signal are fed to separate time-averaging circuits, each of which includes a capacitor on which the respective signal is stored. The signal from the water-cut monitor is gated by the signal from the meter such that the water-cut signal stored on the capacitor in its respective averaging circuit is adjusted proportionately to the flow rate measured by the meter. At suitable time intervals the capacitors are interrogated to obtain read-outs representative of the charges thereon and the capacitors are discharged. The above-described cycle of operation then is repeated.

The charge on one of the capacitors is proportional to the total volume of water passed through the distribution system during the time-averaging interval and the charge on the other capacitor is proportional to the total liquid, i.e., oil and water, passed through the system during this interval. Thus, the read-outs obtained present data from which the net oil and net water delivered by the system may be determined.

More particularly, and with reference to FIG. 1, there is illustrated a fluid distribution system comprising a conduit 10 which extends from a suitable source of crude oil such as a gas-oil separator to a terminal point such as a pipeline. Located in the conduit 10 is a capacitance type water-cut probe 12 which operates as follows. The concentration of water in the crude oil is reflected in the dielectric constant of the water-oil mixture which in turn is detected by the capacitance effect of probe 12. The probe 12 is connected to a signal-producing means 14 which typically may take the form of a bridge circuit which compares the capacitance detected by the probe 12 against a standard capacitance to produce an analog d-c signal in which amplitude is proportional to the water content in the oil, passing the probe. While a capacitance probe of the type described will usually be preferred, it is to be recognized that other types of water-cut monitors may be utilized. For example, the water-cut monitor may take the form of an acoustic system in which the velocity or attenuation of an acoustic signal is used to ascertain the water content of the crude oil.

Also located in the conduit 10 is a flow meter 16 of any suitable type which produces an output signal representative of the volume of liquid flowing through the conduit. By way of example, flow meter 16 may be a turbine meter of the type disclosed in U. S. Pat. No. 3,164,020 to E. L. Groner et al. In this meter, signals from a magnetic pickup head (not shown) on the meter are applied to a pulse shaping and amplifying means 17 which serves to produce a frequency variable pulse signal of constant-amplitude, constant-duration d-c pulses.

The flow signal from signal-producing means 17 is passed to an RC averaging circuit 21 comprising a resistor 22 and a capacitor 24. The averaging circuit also is provided with an operational amplifier 26 such that a linear charging rate is obtained for capacitor 24. Thus, the averaging circuit functions to increase the charge on the capacitor 24 by a constant increment in response to each constant energy pulse from means 17 and prevents the capacitor from discharging between pulses. The operational amplifier 26 may be of any suitable design and for an illustrative description of such amplifiers reference is made to TRANSISTOR CIRCUIT DESIGN, Walston, J. A. et al, editors, McGraw Hill Book Company, Inc., New York, 1963, pp. 193–196.

Connected to the averaging circuit 21 is a sensing circuit 27 which comprises a high impedance coupling device 28 such as a cathode or emitter follower which produces an output signal while preventing the capacitor 24 from discharging through the sensing circuit. The current in the sensing circuit is a function of the charge on capacitor 24 which in turn is representative of the cumulative flow volume through the meter 16 over any given time interval.

The sensing circuit is connected to a recording system 30 through a normally open switch 32 which is adapted to be intermittently closed by an interrogator 34 in order to apply the read-out signal from the sensing circuit to the recording system. The interrogator 34 may be of any suitable design. For example, the interrogator may comprise an electromechanical timer which momentarily closes switch 32 at regular time intervals. Simultaneously with, or if desired immediately after, the closing of switch 32 the interrogator 34 functions to momentarily close a switch 36 in a low impedance shunt circuit 37 in order to discharge the capacitor 24. Thereafter, with switches 32 and 36 open the capacitor 24 is charged until such time as the sensing circuit is again interrogated to obtain a read-out representative of the charge on the capacitor.

The water-cut signal from the signal producing means 14 is applied to a time-averaging circuit 38 which may be similar to the above-described circuit 21. In this case, however, the circuit interconnecting means 14 and averaging circuit 38 is provided with means for modulating the water-cut signal in proportion to the flow signal from means 17. More specifically and as shown in FIG. 1, the signal from means 14 is passed through a d-c amplifier 40 of conventional design to circuit 38 which comprises a resistor 42, a capacitor 43, and an operational amplifier 44. The pulses from means 17 are applied by means of a circuit 46 to amplifier 40 and used to gate this amplifier such that it produces a d-c pulse signal in which the pulse amplitude is proportional to water-cut and the pulse frequency proportional to flow rate. Thus, the output from the amplifier is a modulated water-cut signal which is adjusted proportionally to the flow rate through meter 16. This modulated signal from amplifier 40 is fed to circuit 38 where it is stored on capacitor 43 for periodic interrogation.

A follower sensing circuit 47 comprising a high impedance coupling device 48 is connected to averaging circuit 38 to produce an output signal proportional to the charge on the capacitor 43 at any given time. The read-out signal from circuit 47 is applied to the recording system 30 similarly as described above with regard to the meter signal. Thus, interrogator 34 periodically closes a switch 49 concomitantly with the closure of switch 32 in order to apply the read-out signal to recording system 30. In addition, interrogator 34 functions to close a switch 50 in a low impedance shunt circuit 51 in order to discharge capacitor 43 at each interrogation.

From the foregoing description it will be recognized that the water-cut signal fed to capacitor 43 is adjusted in order to compensate for variations in flow rate between interrogations. For example, over a given time interval the charge stored on capacitor 43 for a flow rate of "R" and a percent water-cut of "W" would be one-half of the charge stored on capacitor 43 for a flow rate of 2R and the same water-cut W. Thus, the charge stored on capacitor 43 over a time interval is representative of the total volume of water passed through the fluid distribution system during this time interval.

Preferably the meter signal applied to circuit 21 is in the form of constant-amplitude, constant-duration pulses which vary in frequency in proportion to flow rate. However, the meter signal may take the form of constant amplitude pulses which vary in duration, or in duration and frequency, in proportion to flow rate. Also, the water-cut signal applied to amplifier 40 may be in pulse form. For example, the water-cut signal from means 14 can take the form of constant-energy, frequency-variable pulses. In this case, circuit 46 can be provided with a d-c converter which functions to produce a d-c voltage having an amplitude proportional to the applied pulse frequency. The output of the converter is used to control the gain on amplifier 40 to modulate the water-cut signal.

The present invention may be utilized to advantage where it is desirable to apply read-outs from a plurality of meter points to a central recording and/or computation station. In this case, the desired information for each meter point may be stored locally by the relatively simple and inexpensive circuitry shown in FIG. 1 and then interrogated on a time-share basis for application to the central station.

Figure 2:
FIG. 2 is a schematic illustration showing an application of the invention in obtaining data from a plurality of measuring stations.

This application of the invention is illustrated in FIG. 2 wherein there is shown a fluid distribution system comprising a plurality of secondary flow lines such as those indicated by reference numerals 52 and 54 leading to a primary flow line 55. The secondary flow lines 52 and 54 are provided with meter points 56 and 57, respectively, each of which includes a water-cut monitor, flow meter, and the associated circuitry as shown in FIG. 1. The read-out circuits for each meter point are connected through normally open switches, which correspond to switches 32 and 49 shown in FIG. 1, to a central station 58.

The read-out switches for the respective meter points are controlled by a central interrogating system which functions to sequentially close the switches to apply read-out signals to the central station 58 on a time-share basis. Thus, as shown in FIG. 2, the interrogating system may comprise a multi-contact stepping switch 60 which is driven by a suitable timing device (not shown) such that it advances from one contact to another at suitable time intervals. From an examination of FIG. 2 it can be seen that when the stepping switch 60 closes contact 56a it functions to momentarily close switches 56b and 56c whereupon read-out signals representative of water-cut and total volume are applied to the central station 58. Thereupon, the stepping switch continues in counter-clockwise rotation to the next successive contact 57a and switches 57b and 57c are closed to apply read-out signals from meter point 57 to the central station.

The present invention may be utilized in fluid distribution systems where only total volume information is necessary from one or more meter points. In this case, the water-cut probe and its associated circuitry shown in FIG. 1 may be dispensed with and a meter point will consist only of a turbine meter and its associated averaging and sensing circuits. In this application of the invention an interrogation system may sequentially scan the meter points, as described above with regard to FIG. 2, and apply the read-out signal from each point to a central station on a time-share basis. In this case, each meter point will have only one read-out switch, this being the switch corresponding to switch 32 shown in FIG. 1.

The sensing circuits shown in FIG. 1 provide for analog read-out signals for application to the recording and/or computation station. While this is acceptable in many cases, situations may be presented where it will be preferred to provide for digital read-outs. For example, in an oil field operation it may be necessary to telemeter the read-out signals from a large number of meter points over relatively long distances to a central station. In this case, the transmission of such signals may be expedited by providing for digital read-outs from the meter points.

Figure 3:
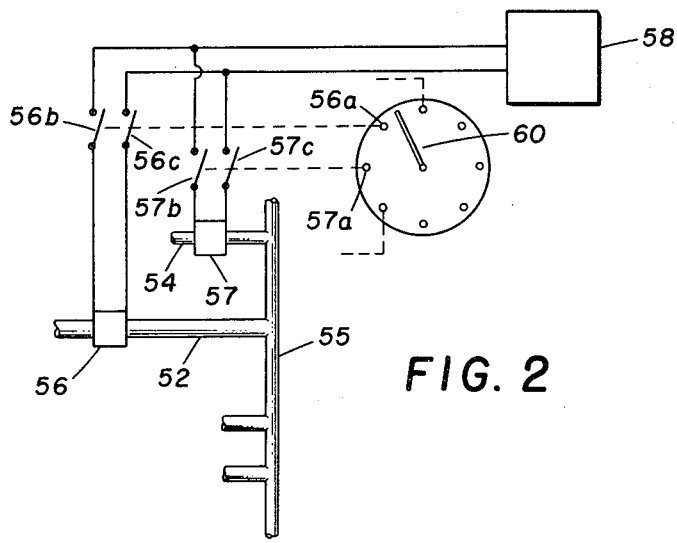
FIG. 3 is a schematic illustration of a further embodiment of the invention as utilized in obtaining gas flow measurements in a gas distribution system.

The use of a sensing circuit which provides for a digital read-out is illustrated in FIG. 3 which also illustrates the application of the invention in obtaining flow information for a gas distribution system.

With reference to FIG. 3, there is illustrated a gas distribution system comprising a conduit 62 having a flow rate meter such as an orifice plate 64 located therein. Connected across the orifice plate by means of conduits 65 and 66 is a ΔP (differential pressure) transducer 67 of conventional design which produces an analog d-c signal proportional to the pressure drop across the orifice plate. As will be understood by those skilled in the art, this pressure drop is proportional to the gas flow velocity. Thus, the output from the ΔP transducer 67 is representative of the volumetric gas flow rate through the distribution system. The analog output from the ΔP transducer 67 is applied to an analog-to-frequency converter 68 which produces a d-c signal of frequency variable pulses proportional to the pressure drop across plate 64.

Also connected to the conduit 62 by means of a conduit 70 is a P (pressure) transducer 72 which produces an analog d-c signal proportional to the gas pressure within conduit 62. The signal from P-transducer 72 is passed through a d-c amplifier 74 to an averaging circuit 76 comprising a resistor 77, a capacitor 78, and an operational amplifier 80. The pulses from the analog-to-frequency converter 68 are applied to amplifier 74 to gate this amplifier such that it produces a d-c pulse signal in which the pulse amplitude is proportional to pressure and the pulse frequency is proportional to differential pressure. The pulse output from amplifier 74 is applied to the averaging circuit 76 where it is stored on capacitor 78 similarly as described above with reference to circuit 38 in FIG. 1.

Connected to the averaging circuit 76 is a sensing circuit 82 which is self-interrogating and provides for a digital read-out representative of the charge on capacitor 78. The circuit 76 comprises a unijunction transistor 83 which is connected at one end of its base to the positive side of a d-c power supply 84 and at the other end to a relay 85. When the charge on capacitor 78 reaches a specified level corresponding to some cumulative flow volume through orifice plate 64, the transistor 83 breaks down and allows the capacitor 78 to discharge through the transistor 83 and the relay 85. Relay 85 then acts to close a contact 86 to produce a digital signal which may be telemetered to a local or remote recording and/or communications station via a communications channel 88. The relay 85 also closes a contact 89 in a low impedance shunt circuit 90 thus allowing for rapid discharge of capacitor 78. After the capacitor has discharged, the unijunction transistor no longer conducts and the relay 85 drops out opening its associated contacts 86 and 89.

The system shown in FIG. 3 functions to adjust the signal stored on capacitor 78 in proportion to the static pressure in the gas distribution system and the flow rate through the system. Thus, from the signal stored on capacitor 78 the cumulative amount of gas in standard units of volume delivered through conduit 62 over any given time interval may be determined.

While in the embodiment shown in FIG. 3 the modulated signal stored on capacitor 78 is produced by using the pulse output analog-to-frequency converter 68 to gate an analog signal from P-transducer 72, it is to be recognized that other suitable arrangements may be used. For example, the analog output from ΔP-transducer 67 could be converted to a frequency-variable constant-amplitude pulse signal which is passed through an amplifier and then applied to averaging circuit 76. In this case, the analog signal from transducer 72 may be used to control the gain of the amplifier in order to increase or decrease the pulse amplitude in proportion to the total pressure within conduit 62. Also, a pulse signal representative of pressure may be utilized to gate an analog ΔP signal. For example, the output from P-transducer 72 may be applied to an analog-to-frequency converter such as that indicated by reference numeral 68 in order to produce a frequency-variable pulse signal proportional to static pressure. The analog signal from ΔP-transducer 67 then could be applied directly to amplifier 74 and the pulse pressure signal used to gate this amplifier.

Digital read-outs from a plurality of meter points may be applied to a central recording and/or computing station such as described above with reference to FIG. 2. In this case, the read-out signals from the meter points could be applied to local accumulators which are sequentially scanned at suitable time intervals. Alternatively, a quiescent telemetering system may be utilized in which digital signals from the meter points are applied through a suitable traffic control system directly to the central station.

In the time-averaging circuits shown in FIGS. 1 and 3, it will be recognized that some signal loss will occur during the time that the capacitors are discharging. For example, with regard to averaging circuit 21 (FIG. 1), some pulse output from means 17 will be lost during the time that switch 36 is closed. In most instances the discharge rate of a capacitor will be relatively rapid such that the signal loss is of little consequence. However, if desired, each averaging circuit can be provided with two capacitors which are alternatively switched into and out of the averaging circuit, such as shown in U.S. Pat. No. 2,950,052 to Knox.

Having described specific embodiments of the instant invention, it will be understood that further modifications thereof may be suggested to those skilled in the art, and it is intended to cover all such modifications as fall within the scope of the appended claims.

What is claimed is:

1. In a method of characterizing a fluid flowing through a conduit, the steps comprising:
    a. generating a d-c signal representative of a characteristic of said fluid;
    b. generating a d-c signal of constant-amplitude pulses representative of the fluid flow through said conduit;
    c. modulating said characteristic signal in proportion to said fluid flow signal to produce a modulated signal of d-c pulses;
    d. applying said modulated signal to a first capacitor to charge said capacitor over a time interval;
    e. concomitantly with step (d) applying said fluid flow signal to a second capacitor to charge said capacitor over a time interval;
    f. producing a read-out signal representative of the charge on each of said capacitors and discharging said capacitors; and
    g. charging said capacitors in accordance with steps (d) and (e) and repeating step (f).

2. The method of claim 1 wherein said fluid comprises a plurality of components and said characteristic signal is representative of the concentration of one of said components in said fluid.

3. The method of claim 2 wherein said fluid is an oil-water mixture and said characteristic signal is representative of the water content of said mixture.

4. The method of claim 3 wherein said characteristic signal is an analog signal, said pulses comprising said fluid flow signal are frequency-variable and of constant duration, and said characteristic signal is gated in proportion to said fluid flow signal to produce a modulated signal of d-c pulses in which pulse-amplitude is proportional to water content and pulse-frequency is proportional to flow rate.

5. In a time averaging read-out system for a fluid flow meter and a fluid characteristic monitor, the combination comprising:
   first and second signal means for producing, respectively, a d-c signal representative of the fluid characteristic measured by said monitor and a d-c signal of constant-amplitude pulses representative of the fluid flow through said meter;
   first and second capacitors;
   first circuit means interconnecting said first signal means and said first capacitor;
   modulating means in said first circuit means for modulating said characteristic signal in proportion to said fluid flow signal to produce a modulated signal of d-c pulses for application to said first capacitor;
   second circuit means interconnecting said second signal means and said second capacitor for applying said fluid flow signal to said second capacitor concomitantly with the application of said modulated signal to said first capacitor;
   means for producing a read-out signal representative of the charge on each of said capacitors; and
   means for discharging said capacitors.

6. In a system for determining the net oil and net water in an oil-water mixture, the combination comprising:
   a water-cut monitor;
   first signal means associated with said monitor for producing an analog d-c signal representative of water content;
   a flow meter;
   second signal means associated with said meter for producing a d-c signal of constant-amplitude, frequency-variable pulses representative of fluid flow through said meter;
   first and second capacitors;
   first circuit means interconnecting said first signal means and said first capacitor;
   modulating means in said first circuit means for gating said water content signal in proportion to said fluid flow signal to produce a modulated signal of d-c pulses in which pulse amplitude is proportional to water content and pulse frequency is proportional to flow rate;
   second circuit means interconnecting said second signal means and said second capacitor for applying said fluid flow signal to said second capacitor concomitantly with the application of said modulated signal to said first capacitor;
   means for producing a read-out signal representative of the charge on each of said capacitors; and
   means for discharging said capacitors.

* * * * *

UNITED STATES PATENT OFFICE
CERTIFICATE OF CORRECTION

Patent No. 3,693,435                    Dated September 26, 1972

Inventor(s) John B. Cox and Jacque R. Stoltz

It is certified that error appears in the above-identified patent and that said Letters Patent are hereby corrected as shown below:

Title page, between "[72] Inventors: . . ." and "[22] Filed: . . ."

insert --Assignee: Mobil Oil Corporation--

Column 8, line 34, "alternatively" should read --alternately--.

Signed and sealed this 10th day of April 1973.

(SEAL)
Attest:

EDWARD M. FLETCHER, JR.                 ROBERT GOTTSCHALK
Attesting Officer                       Commissioner of Patents